May 5, 1925.  
P. F. KURTENBACH  
ATTACHMENT FOR CORN PICKERS  
Filed May 21, 1924
1,536,887
2 Sheets-Sheet 2
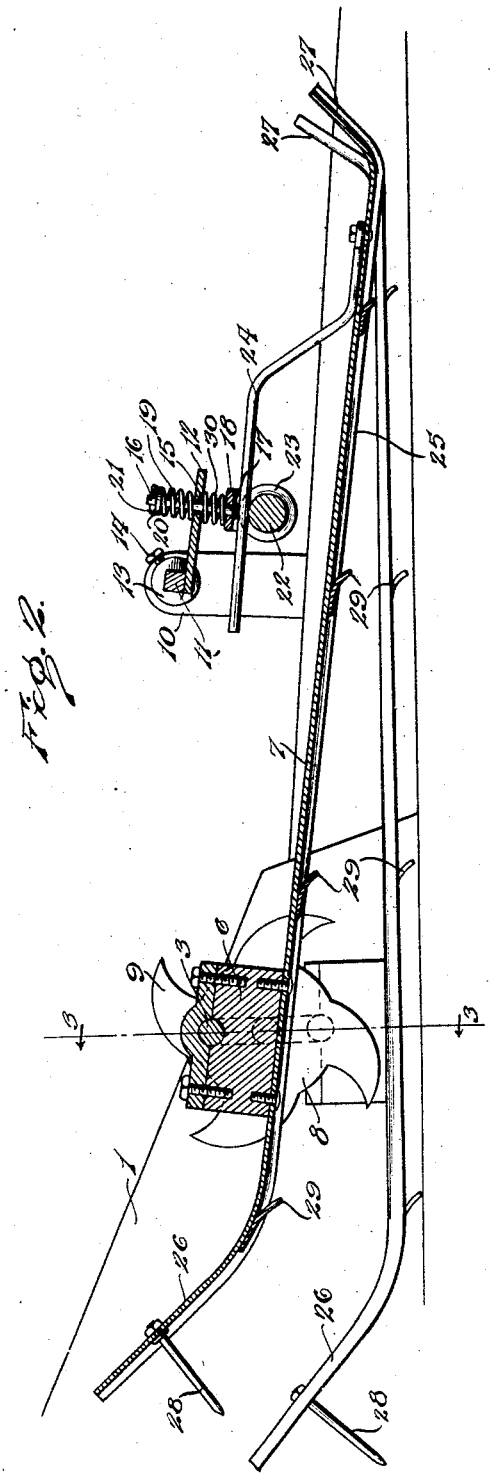
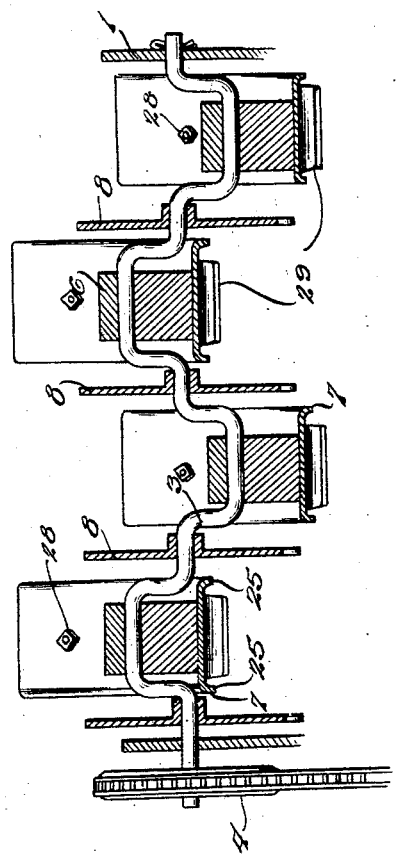

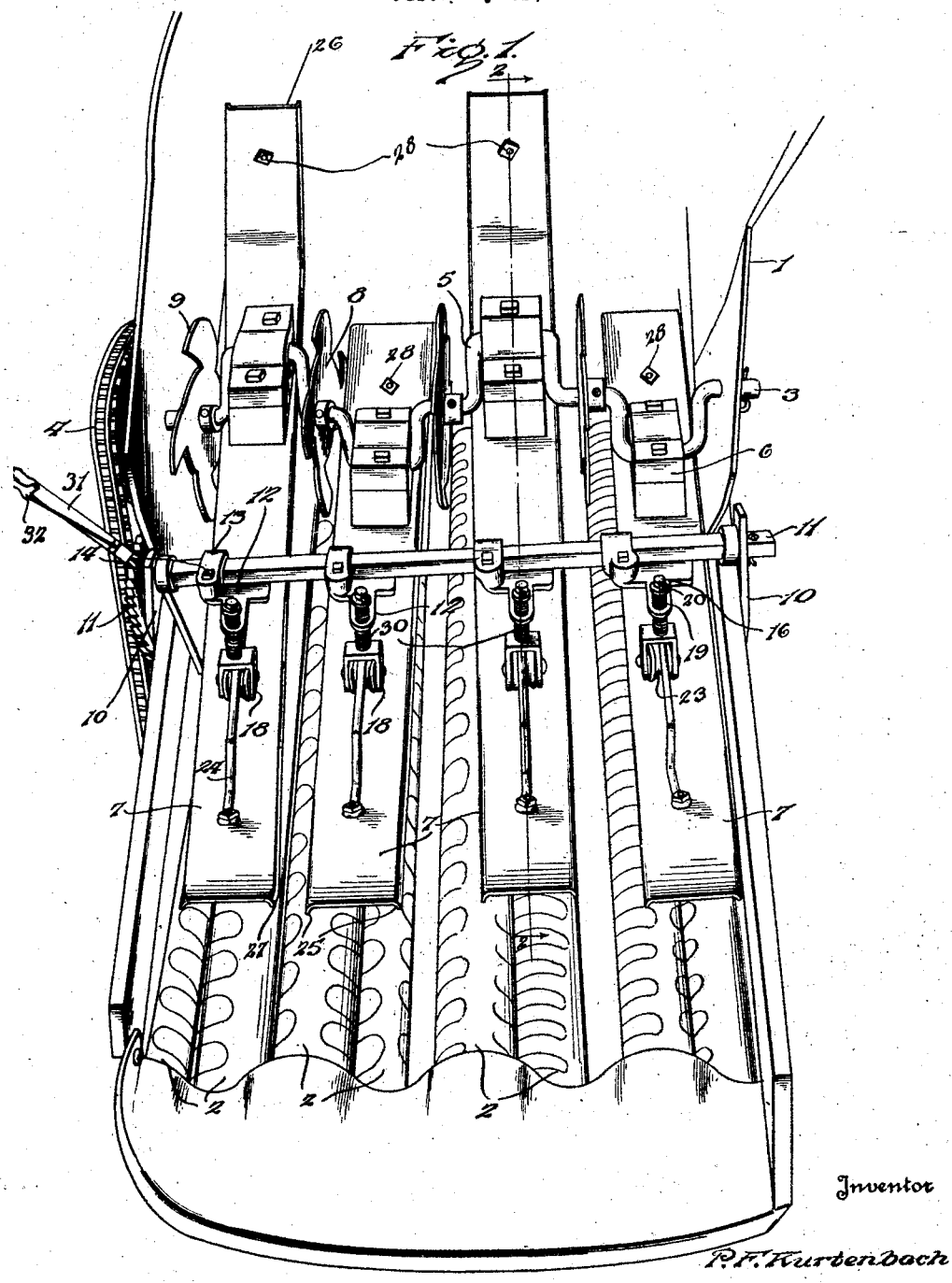

Patented May 5, 1925.

1,536,887

UNITED STATES PATENT OFFICE.

PRESTON F. KURTENBACH, OF BROOKINGS, SOUTH DAKOTA.

ATTACHMENT FOR CORN PICKERS.

Application filed May 21, 1924. Serial No. 714,928.

*To all whom it may concern:*

Be it known that I, PRESTON F. KURTENBACH, a citizen of the United States, residing at Brookings, in the county of Brookings and State of South Dakota, have invented certain new and useful Improvements in Attachments for Corn Pickers, of which the following is a specification.

This invention has reference to that class of agricultural machines in which ears of corn are stripped from standing stalks as the machine is drawn over the field, the stalks being left standing and the ears being delivered to a conveyer or chute through which they travel to and over husking rolls by which the husks are removed and the corn then delivered upon a second elevator or conveyer to be transferred to a wagon or other vehicle for transportation to a place of storage or use. In the operation of these machines, it frequently happens that the ears of corn are presented crosswise to the husking rolls so that the husks are not removed cleanly from the ears and frequently choking of the machine results. It sometimes happens also that pieces of the stalks are broken off and travel to the husking rolls with the ears of corn, the husks and the pieces of stalks accumulating over the rolls so that the machine must be frequently stopped until the obstruction can be removed. These happenings cause delay in harvesting the crop and thereby add to the expense of operations. It is the object of my invention to provide an attachment which may be applied to any of the corn-picking machines now in use and by the operation of which the ears of corn will be presented lengthwise to the husking rolls and fed endwise over the same to the delivery conveyer, and a further object of the invention is to provide means whereby the husks and the broken pieces of stalk which may be present will be positively fed between the husking rolls to drop upon the ground. The objects of my invention are attained in such a mechanism as is illustrated in the accompanying drawings, and the invention resides in certain novel features which will be hereinafter first fully described and then more particularly pointed out in the appended claims.

In the drawings:

Figure 1 is a front perspective view of my attachment in operative position over the husking rolls;

Fig. 2 is a longitudinal section on the line 2—2 of Fig. 1, and

Fig. 3 is a transverse section on the line 3—3 of Fig. 2.

In the drawings, the reference numeral 1 indicates a portion of the frame of the chute which forms a part of the corn-picking machine, and 2 designates the cooperating husking rollers arranged longitudinally within the bottom of the chute. In carrying out my invention, I mount in the side rails of the chute near the upper end thereof a crank shaft 3 which is equipped at one end with a sprocket 4 whereby it may be driven from any convenient element of the corn picker. The cranks 5 of this shaft 3 are journaled in boxes 6, to the lower sides of which are secured feeder arms 7, and upon the shaft between the cranks thereof I secure disks 8, the peripheral edges of which are preferably formed to present teeth or spurs 9. Upon the side rails of the chute in advance of the crank shaft, I secure short posts or standards 10 in which is fitted a front cross shaft 11, and upon the said shaft, alined with the cranks 5 of the shaft 3, are secured brackets 12 which project forwardly from the said shaft 11, as shown clearly in Figs. 1 and 2. These brackets are each provided at one side with a collar or hub 13 encircling the shaft 11 and carrying a set screw 14 which is adapted to bear against the said shaft and thereby secure the collar and the bracket in fixed position thereon. Fitted through an opening 15 adjacent the front end of each bracket 12 is a pin 16 having a head 17 at its lower end which supports a yoke 18, as shown. A spring 19 is coiled around the pin 16 between the bracket 12 and a washer 20 fitted upon the pin, a cotter pin or similar retaining device 21 being provided at the upper extremity of the holding pin 16 to prevent release of the washer or abutment 20.

In the lower end of the yoke 18 is mounted a roller 22 having an annular groove 23 in its periphery to engage and support a guide arm or rod 24 secured upon the top of the respective feed arm 7 near the front end of the latter, as shown in Figs. 1 and 2. Springs 30 are coiled around the pins 16 between the brackets 12 and the yokes 20, the combined action of the springs 19 and 30 being to hold the picker arms in proper position to engage the ears of corn but permit them to readily yield when larger ears are to pass.

One of the posts 10 is in the form of a segmental rack, and a lever 31 is secured on the adjacent end of the shaft 11 and equipped with a latch 32 to engage the rack. The feeder arms may thus be easily set to a desired normal position according to the average diameter of the ears of corn passing over the husking rollers.

The several feed arms are substantially flat elongated plates having depending flanges 25 at their side edges whereby they are given a shallow channel formation, and these feeder arms or bars or plates should be of such width that each one will span the pair of husking rollers 2 disposed below it whereby an ear of corn received below the feeder arm or plate will be held to the husking rolls and longitudinally in the bight thereof whereby the said rolls will very effectually engage the husks and strip the same from the ear. The rear end of each feeder arm is turned upwardly for a considerable distance, as shown at 26, so that the ear of corn may readily pass below it and the front end of each feeder arm is likewise turned upwardly, as shown at 27, for a lesser distance to permit the ears of corn to readily pass out from under the feeding arm and avoid cutting of the corn by the edge or end of the arm and reduce the shelling. At the rear receiving end of each feeding arm is a husk-engaging and feeding pin 28 which is adapted to slightly penetrate the husks and thereby positively engage the corn and feed it to the husking rollers. At intervals on the under side of the feeding arm, I provide the teeth or feeding lugs 29 which may conveniently be transversely arranged strips of metal projecting downwardly and forwardly from the under side of the arm so that on the forward movement of the arm they will engage the corn and move it forwardly while upon the rear movement of the arm they will readily pass over the corn without engaging the same.

From the foregoing description, taken in connection with the accompanying drawings, it will be seen that I have provided an exceedingly simple device which may be readily attached to a corn picker and by which the passage of the corn to the husking rollers will be controlled. The rotation of the crank shaft 3 imparts a rocking or oscillatory movement to the several feeding arms in orbital paths so that the said arms will move upwardly from the husking rolls as they move rearwardly and upon the return movement will move downwardly and forwardly. Upon the upward rearward movement, the feeding arms will, of course, clear the ears of corn so that the latter will receive only such movement as will be imparted to them through the action of the husking rollers in engagement with the husks. Upon the return downward and forward movement of the feeding arms, the feeding teeth or projections 29 will positively engage the ears of corn and move them forwardly endwise over the husking rolls. The disks 8 which are secured upon the crank shaft between the feeder arms work in the spaces between the pairs of husking rolls and they, therefore, engage the husks and broken pieces of stalk and force them positively downward between the pairs of husking rolls so that they drop onto the ground without passing through the machine and tending to choke the operation of the same. Should the ears of corn be presented sidewise to the husking rolls, the disks 8 and the feeding arms will engage the ears before they pass to a position over the husking rolls and will turn the ears so that they will be presented endwise to the husking rollers and will be fed longitudinally over said rollers. Upon reference to Fig. 2, it will be noted that the lower ends of the feeding arms have very little, if any, vertical movement so that they positively hold the ears of corn to the husking rolls. The lower ends of the feeding arms are, however, positively supported by the guide rods 24 and the rollers 22 upon which the rods rest, and through the co-action of the rods and the rollers the arms are held in vertical planes in their longitudinal movements. While the feeding arms act to positively feed the ears of corn endwise over the husking rollers, they also serve to retard the travel of the ears of corn sufficiently to prevent them passing more than one at a time to each pair of husking rolls and, consequently, by avoiding jamming of the mechanism, the operation of husking is more expeditiously performed and breakages are practically eliminated. When my attachment is mounted upon the corn-picking machine and operated as described, the corn is husked completely and cleanly notwithstanding that it may be fully ripe or the weather may be very dry. Heretofore it has been impossible to properly husk the corn in dry weather.

Having thus described the invention, I claim:

1. An apparatus for the purpose set forth comprising feeder arms of shallow channel formation each having both its ends turned upwardly, means on the under sides of the arms to engage ears of corn upon forward movement of the arms and to clear the ears of corn upon rearward movement of the arms, means for mounting the arms over pairs of husking rolls, and means for imparting an oscillatory longitudinal movement to the arms.

2. An apparatus for the purpose set forth comprising feeding arms of shallow channel formation, means for mounting said arms above pairs of husking rolls, means for imparting longitudinal oscillatory movement to the arms, husk-engaging pins depending from the upper ends of the arms, and forwardly and downwardly extending projections on the under side of the arms to engage ears of corn disposed below the arms.

3. An apparatus for the purpose set forth comprising a crank shaft adapted to be mounted in the side rails of a corn picker chute, husk-engaging disks secured upon said shaft between the cranks thereof, feeder arms disposed longitudinally of the corn picker chute, means near the upper ends of said arms to suspend the same on the cranks of said crank shaft, and means for supporting the lower ends of the feeder arms and permitting longitudinal oscillatory movement of the same in orbital paths.

4. An apparatus for the purpose set forth comprising feeder arms, brackets disposed above the said arms near the forward ends thereof, rollers carried by said brackets, supporting guides secured to the feeder arms adjacent the front ends thereof and extending upwardly and rearwardly therefrom to pass over the said rollers, and means for supporting the rear ends of the feeder arms and imparting longitudinal oscillatory movement thereto.

5. An apparatus for the purpose set forth comprising feeder arms, a crank shaft, means upon the arms adjacent the upper ends thereof to suspend the arms on the cranks of said shaft, a shaft disposed above the arms adjacent the forward ends thereof, brackets secured upon and projecting forwardly from said shaft, yieldably supported pins carried by said brackets, yokes carried by the lower ends of said pins, and guides secured upon the arms at the front ends thereof and rising upwardly and rearwardly therefrom to pass through and be supported in said yokes.

In testimony whereof I affix my signature.

PRESTON F. KURTENBACH. [L. S.]